June 26, 1934.    G. C. KARSHNER    1,964,064
FERTILIZER NOZZLE ATTACHMENT
Filed May 19, 1933
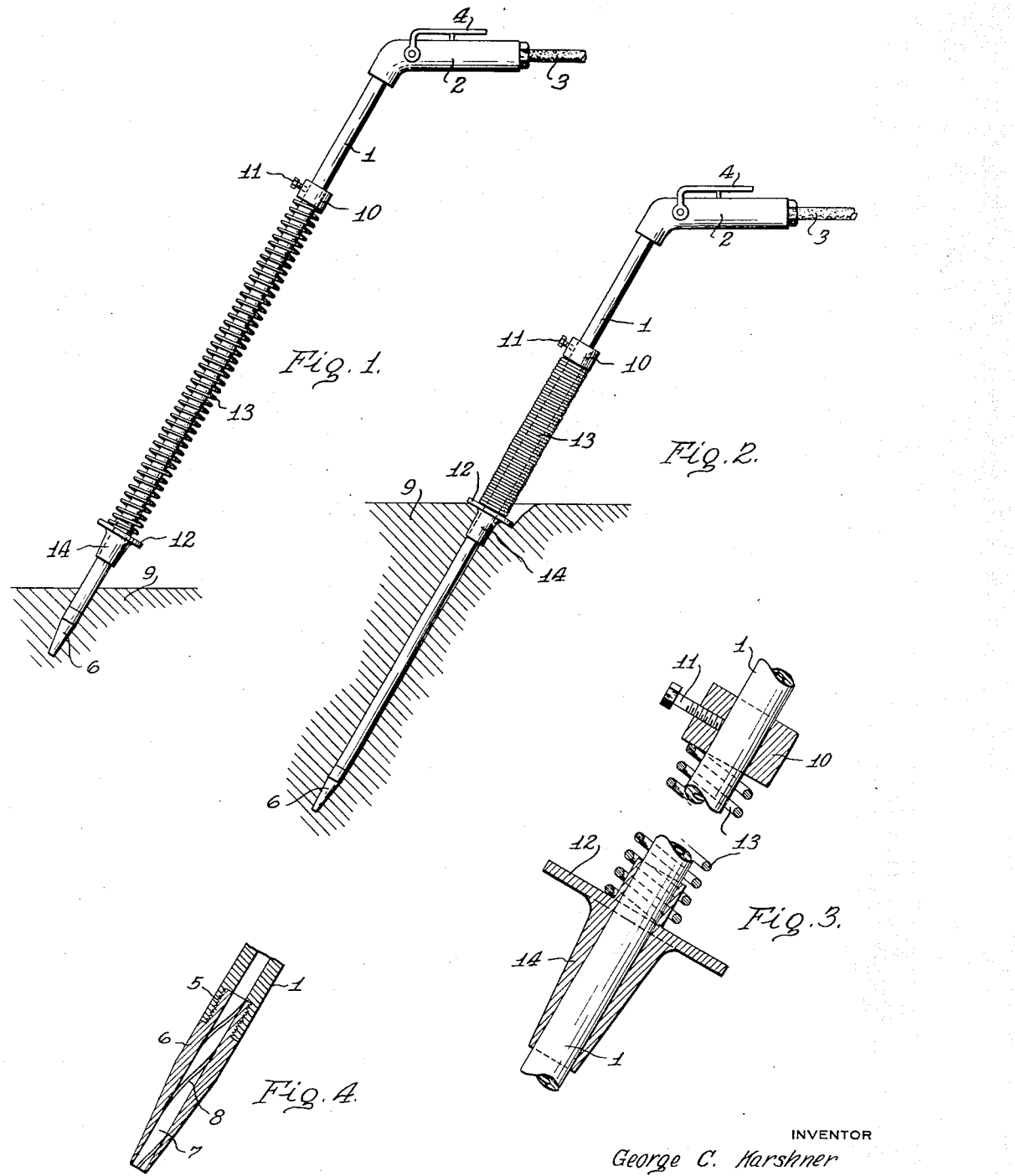
INVENTOR
George C. Karshner
BY
ATTORNEYS Patented June 26, 1934

1,964,064

UNITED STATES PATENT OFFICE 1,964,064

FERTILIZER NOZZLE ATTACHMENT

George C. Karshner, Detroit, Mich.

Application May 19, 1933, Serial No. 671,824

1 Claim. (Cl. 47—49)

The present invention pertains to a nozzle of the type having a handle in which there is provided a valve and means for attaching a supply hose thereto in order that liquid may be forced through the hose and into the nozzle so that by forcing the discharge point of the nozzle beneath the ground surface the liquid may be directed to a point adjacent the roots of trees, the amount of liquid discharged being controlled by the valve in the handle. Such nozzles are commonly known and are used for irrigating and fertilizing or feeding various kinds of plant life, and more especially trees. In feeding trees or any other plant life it is desirable in the interest of economy to evenly distribute the fertilizer or feed in the zone where it will be most effective. Furthermore, an even distribution is desirable so that the fertilizer will not become concentrated in any particular zone in a manner to generate heat and destroy plant life.

Accordingly it is the primary object of the present invention to provide an attachment for nozzles to insure distribution of liquid therefrom in a given zone. The attachment is in the form of a limiting device which is adjustable to suit varying requirements and which functions to limit or define the depth to which the nozzle may be forced in the ground. When the nozzle is being forced into the ground by manual pressure on the handle the valve is opened to permit liquid to discharge from the nozzle and in so doing the liquid washes away the soil in advance of the nozzle and therefore after movement is once started very little pressure is required on the handle to force the nozzle into the ground. Therefore care must be exercised by the operator in order that the nozzle should be stopped at the correct depth and such requirement of care is objectionable in the interest of economy in that it prolongs the period of time required to fertilize a given zone.

In cases where trees are supported in soil beneath a lawn whose appearance must be preserved the use of the nozzle is objected to in cases where the liquid from the nozzle flows upwardly alongside the nozzle and deposits a quantity of soil on top of the grass. In this connection the attachment includes a collar, a spring, and an adjustable abutment for the spring. When the nozzle enters the soil the spring maintains the collar in contact with the ground surface surrounding the nozzle and prevents the flow of liquid upwardly to deposit soil on the surface of the lawn. The flexibility of the spring permits the nozzle to be moved with the collar in contact with the ground surface until the spring is compressed entirely at which time the collar prevents further movement of the nozzle.

With the above and other ends in view, the invention consists in matters hereinafter set forth and more particularly pointed out in the appended claim, reference being had to the accompanying drawing, in which—

Figure 1 is a side elevation of the present invention;

Fig. 2 is a side elevation illustrating another stage in the operation thereof;

Fig. 3 is a fragmentary cross sectional detail, and

Fig. 4 is a cross section of the discharge point of the nozzle.

Like characters of reference are employed throughout to designate corresponding parts.

The nozzle with which the present invention is associated comprises an elongated slender tubular member 1 having its upper end received in a handle 2. The handle is constructed with a passage providing communication between the tubular member 1 and a hose 3 that is connected to the other end of the handle 2. The hose 3 is broken away and it is to be understood that in using the nozzle the hose is connected to a source for supplying liquid under pressure. The nozzle is particularly adapted for sub-surface irrigation or fertilizing and the liquid may be water, a liquid fertilizer, or water in which particles of fertilizer are suspended. The passage in the handle 2 is controlled by a valve so that the flow of liquid therethrough may be controlled, the valve being operated by a lever 4.

The lower end of the tubular member 1 is internally threaded as at 5 to receive a point 6 having a passage or bore 7 that is rifled as at 8. The rifle groove 8 is provided to impart a spiral or swirling motion to the liquid as it flows through the point. As illustrated the point is substantially conical in shape and provides for easy entrance into the ground 9.

A sleeve-like abutment 10 is slidably received on the tubular member 1 and is provided with a set screw 11 that is screwed into engagement with the tubular member 1. The sleeve-like member is therefore capable of adjustment inasmuch as it may be secured by the set screw at any desired place on the tubular member 1.

Slidably mounted on the tubular member 1 is a collar 12 having an axial boss 14 providing sufficient bearing surface to insure sliding movement as a result of pressure on any part of the collar 12, the pressure being applied thereto in a manner to be described. Interposed between the abutment sleeve 10 and the collar 12 is a coil spring 13, the ends of the spring being secured respectively to the collar 12 and abutment 10 by welding, soldering or by bending the ends of the spring into frictional contact therewith.

In operating the present device the nozzle tubular member 1 is forced beneath the ground surface by manual pressure on the handle 2. When the nozzle member 1 has reached a depth approximately as illustrated in Fig. 1, the liquid is allowed to flow therethrough. As the liquid discharges through the point 6 it washes away the soil in advance of the point so that very little manual pressure is required to force the nozzle to a greater depth. As the nozzle continues its downward movement, the collar 12 is brought into contact with the surface of the ground 9 and further movement of the nozzle causes the spring 13 to be compressed. When the spring 13 is completely compressed as illustrated in Fig. 2, further movement of the nozzle is prevented.

Contact of the sleeve 12 with the ground surface in the manner illustrated in Fig. 2 prevents liquid from flowing upwardly alongside the tubular member 1 in a manner to deposit sand on the ground surface directly surrounding the place of entry of the nozzle.

Although a specific embodiment of the present invention has been illustrated and described it is to be understood that various changes may be made within the scope of the appended claim without departing from the spirit of the invention, and such changes are contemplated.

What I claim is:—

The combination with a nozzle including a slender tubular member adapted to be forced into the ground, of a slidable collar on said tubular member, an abutment slidably received on said tubular member, means for securing said abutment against movement relative to said tubular member, and a coil spring sleeved on said tubular member and interposed between said collar and said abutment.

GEORGE C. KARSHNER.